United States Patent Office 3,203,948
Patented Aug. 31, 1965

3,203,948
METAL COMPLEX AZO DYES
Reinhard Neier, Basel, Switzerland, assignor to
Sandoz Ltd., Basel, Switzerland
No Drawing. Filed Aug. 3, 1962, Ser. No. 214,525
Claims priority, application Switzerland, Aug. 22, 1961,
9,794/61
7 Claims. (Cl. 260—145)

This invention relates to azo dyes of the formula

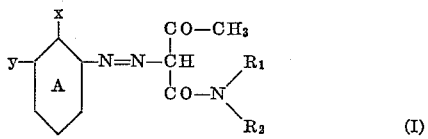

(I)

wherein $R_1$ represents hydrogen or a substituted or unsubstituted alkyl radical,
$R_2$ hydrogen or a substituted or unsubstituted alkyl radical which may be identical with or different from $R_1$,
$x$ a substituent capable of metal complex formation,
$y$ the carboxylic or sulfonic acid group, and wherein the nucleus A may contain further non-dissociable substituents.

These new dyes of Formula I can conveniently be prepared by coupling 1 mole of the diazo compound of an amine of the formula

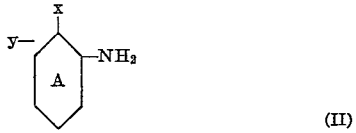

(II)

wherein $x$ and $y$ have the meanings recited above and the nucleus A may contain further non-dissociable substituents, with one mole of a compound of the formula

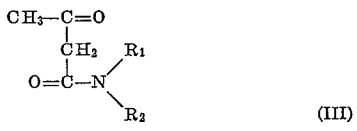

(III)

wherein $R_1$ and $R_2$ possess the meanings recited above.

The new azo dyes may be metallised in substance or on the fiber. They can be treated with a metal-yielding agent under conditions which give rise to a metal-containing azo dye having essentially one atom of metal in complex combination with one molecule of azo compound. For the production of these 1:1 metal-complex compounds a copper-, nickel- or chromium-yielding agent is preferably used.

Alternatively, the dyes can be treated with a metal-yielding agent so that a metal-containing azo dye is formed which contains essentially one atom of metal in complex combination with two molecules of azo compound. For the production of these 1:2 metal-complex compounds it is preferable to allow an amount of metal-yielding agent, e.g., a chromium- or cobalt-yielding agent, containing less than two but at least one atoms of metal, to act upon two molecules of azo compound.

Metallization is best carried out in an alkaline aqueous or organic medium, and the metal compounds may be added in presence of compounds which maintain the metals dissolved in complex combination in caustic alkaline medium; examples of such compounds are tartaric, citric and lactic acid.

Suitable chromium compounds, e.g., chromic fluoride, chromic sulfate, chromic formate, chromic acetate, chromic potassium sulfate and chromic ammonium sulfate. The chromates too, e.g., sodium and potassium chromate or bichromate, are suitable for the metallization of monoazo dyes. Suitable cobalt compounds are e.g., cobaltous formate, cobaltous acetate and cobaltous sulfate. Suitable compounds of copper are, e.g., cupric sulfate, cupric formate, cupric acetate and cupric chloride. Examples of suitable nickel compounds are nickel formate, nickel acetate and nickel sulfate.

The resulting metal complex compounds are precipitated from the aqueous medium by the addition of salt, and then filtered, washed if necessary and dried.

Metallization of a mixture of two or more monoazo dyes of Formula I by the process of the invention, or of mixtures of these and other metallizable azo dyes, results in valuable heterogeneous metal complex dyes whose shades and dyeing properties can be adjusted to every particular use by changing the starting mixture of azo compounds.

The unmetallized azo dyes obtained are suitable for the dyeing of natural and synthetic polyamide fibers and leather. On metallization in the dyebath or in a fresh bath, the dyeings are fast to milling, washing, perspiration, rubbing and light.

The homogeneous or heterogeneous metal-containing azo dyes produced in substance are well soluble in water and dye wool, silk, leather and synthetic polyamide fibers from neutral or weakly acid dyebaths in yellow, red, brown or green shades of good light fastness and good fastness to washing, perspiration, milling and rubbing. They are also well suitable for padding and printing wool, silk and synthetic polyamide fibers, and owing to their good solubility in organic solvents are especially suitable for dyeing solutions of artificial fibers in organic solvents to be subsequently spun as filament and for the coloration of plastics and surface coating materials of all kinds.

The dyeings and coatings are notable for their excellent fastness to water, washing, perspiration, hydrosulphite, sublimation, fats and light.

In the following examples the parts and percentages are by weight and the temperatures in degrees centigrade.

EXAMPLE 1

19.8 parts of 2-amino-4-nitro-1-hydroxybenzene-6-carboxylic acid are dissolved with 6 parts of sodium hydroxide in 100 parts of water and 6.9 parts of sodium nitrite added to the solution. It is run into a mixture of 25 parts of 30% hydrochloric acid and 50 parts of ice-water with ice cooling. The diazo suspension thus formed is poured into a solution of 21.3 parts of 1-acetoacetyl-amino-2-ethyl-hexane, 4 parts of sodium hydroxide, 6 parts of sodium carbonate and 100 parts of water and stirred with ice cooling until the coupling reaction is completed. The resulting yellow-brown dye is precipitated by the addition of 25 parts of 30% hydrochloric acid, filtered off, dried and ground to give a brown powder which dissolves in concentrated sulfuric acid with a greenish yellow coloration.

For conversion into the cobalt complex compound, 42.2 parts of the above dye and 15 parts of cobaltous sulfate in 150 parts of formamide are heated at 100° until metallization is completed. The cobalt complex compound is precipitated by diluting the medium with 400 parts of water, and it is then washed with water, dried and ground. It is obtained as a yellow-brown powder which dissolves very well in solvents, e.g., acetone, alcohol, acetic acid ethyl ester and dimethyl formamide, and is therefore suitable for the coloration of artificial fibers which are spun from solution in such solvents, e.g., cellulose acetate, polyester and polyacrylonitrile fibers. It can also be used for coloring plastics and surface coating materials, e.g., nitrocellulose and vinyl lacquers, in yellow, heat-stable shades of good fastness to light, fats, sublimation, wet rubbing and cross-dyeing, and good adhesive power.

EXAMPLE 2

23.4 parts of 2-amino-4-nitro-1-hydroxybenzene-6-sulfonic acid and 18 parts of 30% hydrochloric acid are stirred into 100 parts of water and diazotized with 6.9 parts of sodium nitrite with ice cooling. The yellow-brown diazo solution is run into a solution of 21.3 parts of 1-acetoacetylamino-2-ethyl-hexane, 4 parts of sodium hydroxide, 6 parts of sodium carbonate and 100 parts of water and stirred with ice-cooling until the coupling reaction is completed. The resulting yellow-brown dye is precipitated by the addition of 25 parts of 30% hydrochloric acid, filtered off, dried and ground. It is a brown powder which dissolves in water in presence of sodium hydroxide to give orange-yellow solutions, and dyes wool by the one-bath chrome dyeing process in yellow shades.

45.8 parts of the above dye and 27 parts of crystallized chromic potassium sulfate in 150 parts of formamide are heated at 100° until metallization is completed. The chromium complex compound is precipitated by diluting with 400 parts of concentrated sodium chloride solution, and filtered off. It is purified by dissolving in dilute aqueous sodium hydroxide solution, filtering clear and subsequently precipitating with hydrochloric acid. On drying and grinding, it is obtained as a brown powder of high solubility in organic solvents, e.g., ketones such as acetone, alcohols such as ethanol, acetic acid alkyl esters, dimethyl formamide, glycols such as glycol ether and amyl acetate. It is therefore well suited for dyeing artificial fibers in organic spinning solutions, e.g., acetate, polyester and polyacrylonitrile fibers, and for the coloration of plastics and surface coatings, e.g., nitrocellulose and vinyl lacquers. In these applications it gives greenish yellow dyeings and coatings which are stable to heat, highly adhesive, and of good fastness to fats, cross-dyeing, sublimation, wet rubbing and light.

Table A below particularizes further starting dyes which are suitable for the production of homogeneous azo dyes by the procedures set forth in Examples 1 and 2. In column (I) is named the diazo component, in column (II) the coupling component, in column (III) the metal used for metal complex formation, and in column (IV) the shade of the vinyl lacquer coating.

EXAMPLE 22

21.6 parts of the unmetallized dye obtained according to Example 2 from diazotized 2-amino-1-hydroxy-4-nitrobenzene-6-sulfonic acid and 1-acetoacetylamino-2-ethylhexane, 16.1 parts of the dye obtained from diazotized 2-aminobenzene-1-carboxylic acid and 1-phenyl-3-methyl-5-pyrazolone and 27 parts of crystallized chromic potassium sulfate are heated in 150 parts of formamide at 110° until no further chromium-free starting dye is indicated. The resulting chromium complex compound is precipitated by diluting the medium with water. It is filtered off, purified by dissolving in dilute aqueous sodium hydroxide solution, clear filtration and subsequent precipitation with hydrochloric acid, and then dried and ground. It is now a brown powder which is highly soluble in organic solvents, ketones, alcohols, acetic acid alkyl esters, dimethyl formamide, etc. It is, therefore, suitable for dyeing artificial fibers in spinning solution in organic solvents, e.g., acetate, polyester and polyacrylonitrile fibers, and for the coloration of plastics and surface coatings, e.g., nitrocellulose and vinyl lacquers. The dyeing and coatings are of yellow shade, heat-stable, highly adhesive, and of good fastness to fats, light, sublimation, wet rubbing and cross-dyeing.

In the following Table B the formation of some further heterogeneous metal complex dyes is indicated. Column (I) specifies the amount of the first dye used, column (II) shows its structural composition, column (III) the amount of the second dye, column (IV) its composition, column (V) the metal used, and column (VI) the shade of the spin dyeing on cellulose acetate.

*Table A*

| Example No. | Diazo component (I) | Azo component (II) | Metal (III) | Shade of vinyl lacquer coating (IV) |
|---|---|---|---|---|
| 3 | 2-amino-1-hydroxy-4-nitrobenzene-6-sulfonic acid | 1-acetoacetylamino-2-ethylhexane | Cu<br>Co<br>Ni | Yellow.<br>Do.<br>Do. |
| 4 | 2-amino-1-hydroxy-4-nitrobenzene-6-carboxylic acid | ___do___ | Cr<br>Cu<br>Ni | Do.<br>Do.<br>Do. |
| 5 | 2-aminobenzene-1,6-dicarboxylic acid | ___do___ | Cr | Do. |
| 6 | 2-amino-1-hydroxy-4-chlorobenzene-6-carboxylic acid | ___do___ | Co | Do. |
| 7 | 2-amino-1-hydroxy-4-chlorobenzene-6-sulfonic acid | ___do___ | Co<br>Cr<br>Cu | Do. |
| 8 | 2-amino-1-hydroxy-4-nitrobenzene-6-sulfonic acid | 1-acetoacetylamino-octane | Cr | Do. |
| 9 | ___do___ | 1-acetoacetylamino-hexane | Cr | Do. |
| 10 | ___do___ | 1-acetoacetylamino-1,1-dimethyl-3,3-dimethyl-butane | Cu | Do. |
| 11 | 2-amino-1-hydroxy-4-nitrobenzene-6-carboxylic acid | 1-acetoacetylamino-dodecane | Co | Do. |
| 12 | ___do___ | 1-acetoacetylamino-2-hydroxy-propane | Co | Do. |
| 13 | ___do___ | acetoacetic acid]diethylamide | Cr | Do. |
| 14 | 2-amino-1-methoxy-4-nitrobenzene-6-sulfonic acid | 1-acetoacetylamino-octane | Cr<br>Cu | Do.<br>Do. |
| 15 | 2-amino-1-hydroxy-4-bromobenzene-6-carboxylic acid | ___do___ | Co | Do. |
| 16 | 2-amino-1-hydroxy-4-methylbenzene-6-carboxylic acid | 1-acetoacetylamino-hexane | Cu | Do. |
| 17 | 2-amino-1-hydroxy-4-tert. amylbenzene-6-sulfonic acid | 1-acetoacetylamino-2-ethylhexane | Cr | Do. |
| 18 | 2-amino-1-hydroxy-4-methylsulfonyl-benzene-6-sulfonic acid | ___do___ | Cr | Do. |
| 19 | 2-amino-1-hydroxy-4-phenylbenzene-6-sulfonic acid | 1-acetoacetylamino-3-methoxy-propane | Cr | Do. |
| 20 | 2-amino-1-hydroxy-4-methoxybenzene-6-carboxylic acid | 1-acetyoacetylamino-2-hydroxy-ethane | Co<br>Cu | Do.<br>Do. |
| 21 | 2-amino-1-hydroxy-4-acetylaminobenzene-6-sulfonic acid | 1-acetoacetylamino-octane | Cr | Do. |

Table B

| Example No. | Parts (I) | Monoazo compound of formula (II) | Parts (III) | Metallizable monoazo compound(s) of other conditions (IV) | Metal (V) | Shade of spin dyeing on acetate (VI) |
|---|---|---|---|---|---|---|
| 23 | 21.6 | 2-amino-1-hydroxy-4-nitrobenzene-6-sulfonic acid→1-acetoacetylamino-2-ethylhexane. | 16.1 | 2-amino-1-benzene-carboxylic acid→1-(3'-chloro)-phenyl-3-methyl-5-pyrazolone. | Cr Cu | Yellow. Do. |
| 24 | 21.6 | ___do___ | 15.4 | 2-amino-1-hydroxy-5-nitrobenzene→2-hydroxy-naphthalene. | Cr | Green. |
| 25 | 21.6 | ___do___ | 21.0 | 2-amino-1-hydroxy-benzene-4-sulfonic acid amide→2-phenylamino-naphthalene. | Cr | Olive-brown. |
| 26 | 21.1 | 2-amino-1-hydroxy-4-nitrobenzene-6-carboxylic acid→ 1-acetoacetylamino-2-ethylhexane. | 23.1 | 2-amino-1-hydroxy-benzene-4-sulfonic acid amide→ 2-hydroxynaphthalene-3-carboxylic acid phenylamide. | Co | Scarlet. |
| 27 | 38 | ___do___ | 4.3 | 2-amino-1-hydroxy-4-nitrobenzene-6-carboxylic acid→ 2-phenylamino-naphthalene. | Co | Greenish. |
| 28 | 21.1 | ___do___ | 15.4 | 2-amino-1-hydroxy-5-nitrobenzene→2-amino-naphthalene. | Co | Green. |
| 29 | 21.1 | ___do___ | 21.1 | 2-amino-1-hydroxy-4-nitrobenzene-6-sulfonic acid→1-acetoacetyl-aminobenzene. | Cr Co | Yellow. Do. |

EXAMPLE 30

24.1 parts of the chromium containing dye obtained by complex formation with diazotized 2-amino-1-hydroxy-4-nitrobenzene-6-sulfonic acid and 1-acetoacetylamino-2-ethylhexane, which contains one mole of metal to one mole of dye, and 17.8 parts of the metal-free monoazo dye obtained from diazotized 2-aminobenzene-1-carboxylic acid and 1-(4'-chloro)-phenyl-3-methyl-5-pyrazolone are heated in 250 parts of formamide with 5 parts of sodium hydroxide at 100° until the metal-free dye has disappeared. The resulting chromium complex compound is precipitated by dilution with 700 parts of water, filtered off, washed well with water, dried and ground to give a yellow powder. This readily dissolves in polar organic solvents and is suitable for dyeing artifical fibers in spinning solution in organic solvents in yellow shades. It can also be used for coloring surface coatings and plastics, e.g., nitrocellulose and vinyl lacquers. The dyeings and coatings have good fastness to light, washing, cross-dyeing, water-perspiration, dry cleaning, decatising, pressing and sublimation.

DYEING EXAMPLE A 100 parts of secondary cellulose acetate with a content of 54-55% splittable acetic acid are dissolved in 300 parts of solvent, e.g., a mixture of 275 parts of acetone and 25 parts of methanol. The solution is stirred and left overnight to swell.

Next day 1 part of the chromium-containing azo dye obtainable according to Example 2 is dissolved in 60 parts of the same solvent mixture. The cellulose acetate solution is added and the whole stirred until 60 parts of solvent have evaporated. After filtration through a cotton filter and a cotton-wool filter press the process continues to the formation of the filament, in the same way as in the production of undyed acetate. The filament is dyed a fast, greenish yellow shade, and has good fastness to water, washing, hydrosulfite, solvents, cross-dyeing, gas fumes and light.

DYEING EXAMPLE B

A lacquer medium is prepared with 20 parts of the vinyl chloride-vinyl acetate copolymer composition "Vinylite VMCH" (registered trademark of Union Carbide Corporation), 70 parts of methylethyl ketone and 10 parts of ethylene glycol. 0.5 part of the cobalt-containing dye of Example 1 are stirred into 10 parts of this medium, which is then diluted with 25 parts of methylethyl ketone-clycohexanone mixture 1:1. The resulting lacquer is cast upon an aluminum foil and air-dried. The coating is greenish yellow, heat-resistant of good adhesivity and of good fatsness to light, sublimation, wet rubbing, top finishing and fats.

DYEING EXAMPLE C

A dyebath is prepared with 100 parts of water and 0.2 part of the chromium-complex compound of Example 2. 10 parts of wetted-out wool are entered at 40°, the bath brought to 100° in 20 minutes and maintained at this temperature for 1 hour. During dyeing 2 parts of 10% acetic acid are dropped into the boiling bath and the water lost by evaporation is replaced from time to time. After dyeing, the yellow-dyed wool is removed, rinsed and dried.

Formulae of representative dyes of the foregoing examples are as follows:

EXAMPLE 1

The 1:2 cobalt complex compound of the azo dye of the formula

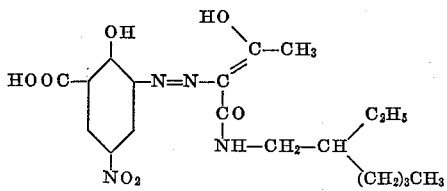

in the metal complex form

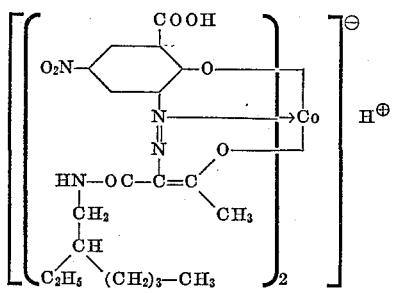

EXAMPLE 2

The 1:2 chromium complex compound of the azo dye of the formula

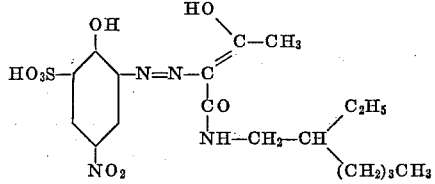

in the metal complex form

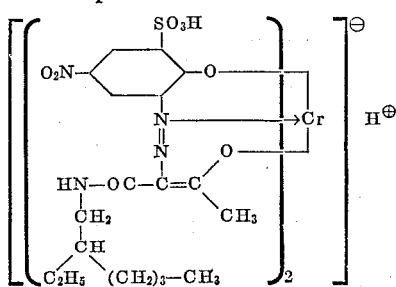

EXAMPLE 3

The 1:1 copper complex compound of the azo dye of the formula

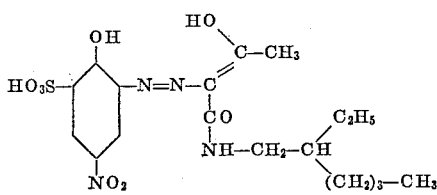

in the metal complex form

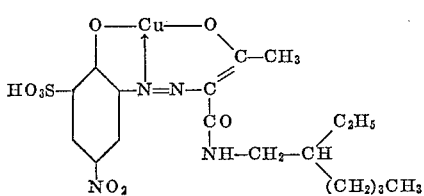

EXAMPLE 4

The 1:1 copper complex compound of the formula

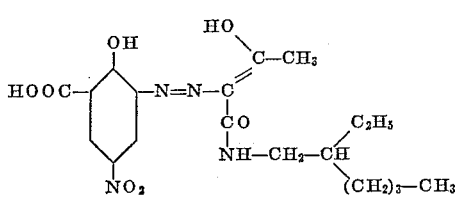

in the metal complex form

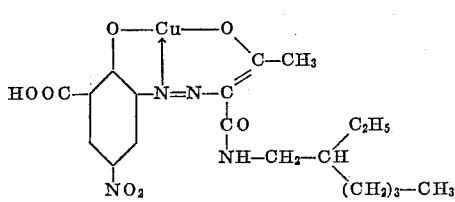

EXAMPLE 10

The 1:2 cobalt complex compound of the azo dye of the formula

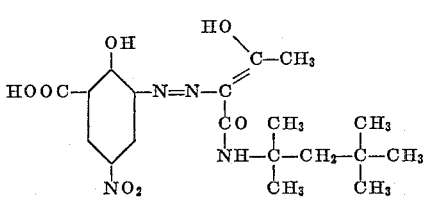

in the metal complex form

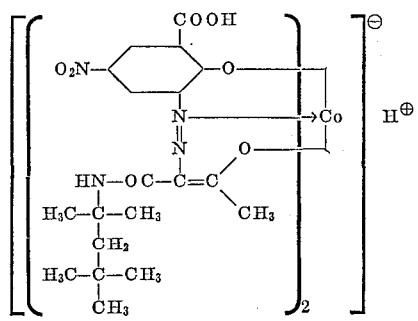

Having thus disclosed the invention what I claim is:

1. A member selected from the group consisting of the 1:1-copper, 1:1-nickel, 1:2-chromium and 1:2-cobalt complex compounds of dyes of the formula

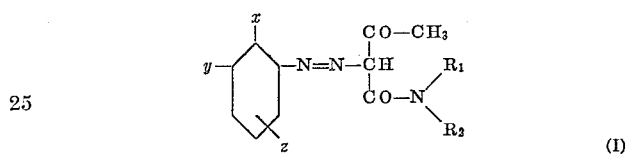

wherein
$R_1$ is a member selected from the group consisting of hydrogen and lower alkyl,
$R_2$ is an alkyl radical containing from 6 to 12 carbon atoms,
$x$ reperesents a substituent capable of metal complex formation selected from the group consisting of hydroxy, methoxy and carboxy,
$y$ is a member selected from the group consisting of the carboxylic and sulfonic acid group, and
$z$ is a member selected from the group consisting of chlorine, bromine, lower alkyl, and nitro.

2. The 1:2 cobalt complex compound of the azo dye of the formula

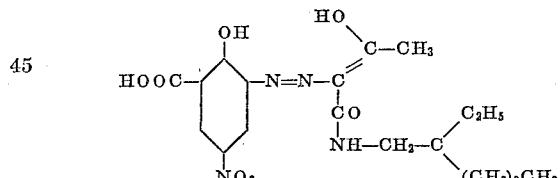

in the metal complex form

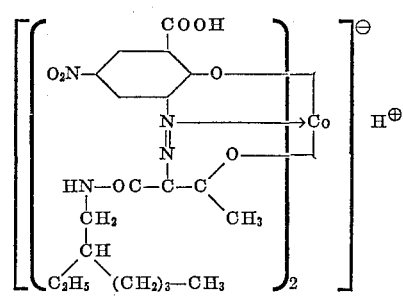

3. The 1:2 chromium complex compound of the azo dye of the formula

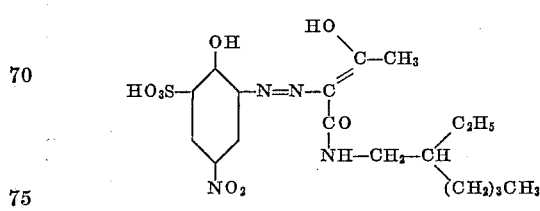

in the metal complex form

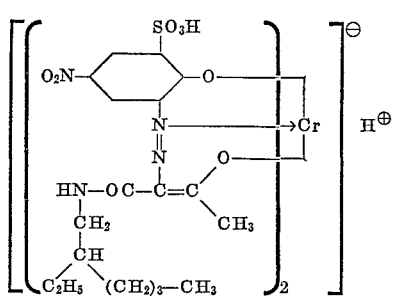

4. The 1:1 copper complex compound of the azo dye of the formula

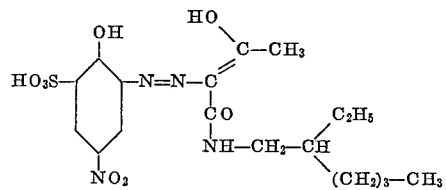

in the metal complex form

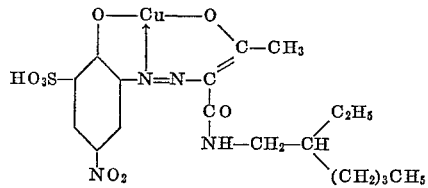

5. The 1:1 copper complex compound of the azo dye of the formula

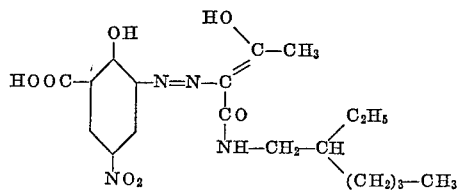

in the metal complex form

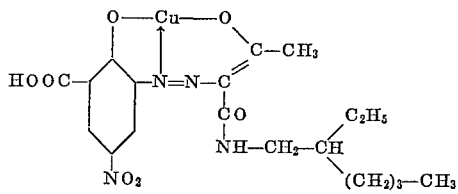

6. The 1:2 cobalt complex compound of the azo dye of the formula

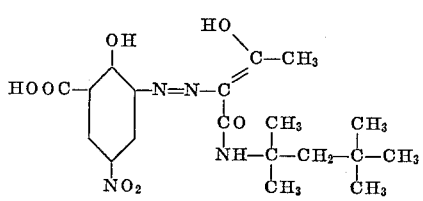

in the metal complex form

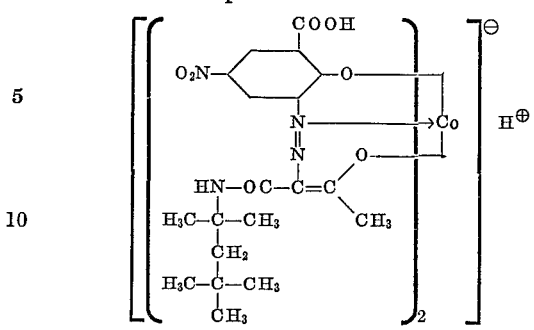

7. A dye mixture consisting essentially of (a) dye molecules of the formula

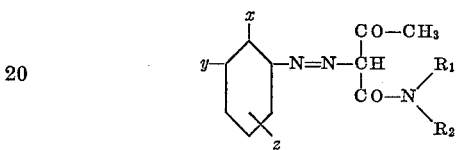

wherein $R_1$ is a member selected from the group consisting of hydrogen and lower alkyl, $R_2$ is an alkyl radical containing from 6 to 12 carbon atoms $x$ represents a substituent capable of metal complex formation selected from the group consisting of hydroxy, methoxy and carboxy, $y$ is a member selected from the group consisting of the carboxylic and sulfonic acid group, and $z$ is a member selected from the group consisting of hydrogen, chlorine, bromine, lower alkyl, lower alkoxy, nitro, lower alkyl sulfonyl, phenyl and lower alkanoylamino, and (b) dye molecules of the formula

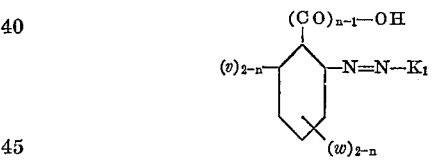

wherein $v$ is a member selected from the group consisting of hydrogen, COOH and SO$_3$H, $w$ is a member selected from the group consisting of NO$_2$ and SO$_2$—NH$_2$'

$n$ is one of the integers 1 and 2, and $K_1$ is the radical of a coupling component selected from the group consisting of 1-phenyl-3-methyl-5-pyrazolone, 1-chlorophenyl-3-methy-5-pyrazolone, acetoacetylaminobenzene, 2 - hydroxynaphthalene, 2 - hydroxynaphthalene - 3 - carboxylic acid phenylamide, 2 - aminonaphthalene and 2-phenylaminonaphthalene, wherein at least 50% of the dye molecules are (a).

References Cited by the Examiner

UNITED STATES PATENTS

| | | | |
|---|---|---|---|
| 2,305,095 | 12/42 | Mackenzie | 260—149 |
| 2,310,181 | 2/43 | Mackenzie | 260—193 |
| 2,734,895 | 2/56 | Zickendraht | 260—149 |
| 2,806,760 | 9/57 | Brassel et al. | 260—145 |
| 2,814,576 | 11/57 | Zickendraht et al. | 260—151 |
| 2,820,782 | 1/58 | Maderni et al. | 260—193 XR |
| 2,969,351 | 1/61 | Grossmann | 260—193 XR |

FOREIGN PATENTS 1,005,664  4/47  Germany.

CHARLES B. PARKER, *Primary Examiner.*